United States Patent [19]

Kojima

[11] 4,353,636
[45] Oct. 12, 1982

[54] DEVICE FOR CLEANING OPTICAL FIBER TUBE INCORPORATED IN IMAGE FORMING APPARATUS

[75] Inventor: Hiroaki Kojima, Toyokawashi, Japan

[73] Assignee: Minolta Camera Kabushiki Kaisha, Osaka, Japan

[21] Appl. No.: 171,438

[22] Filed: Jul. 23, 1980

[30] Foreign Application Priority Data

Sep. 27, 1979 [JP] Japan .......................... 54-134040[U]

[51] Int. Cl.³ ...................... G03B 27/00; G03B 27/52
[52] U.S. Cl. ........................................... 355/1; 355/30
[58] Field of Search ...................... 355/1, 30

[56] References Cited

U.S. PATENT DOCUMENTS 4,074,217  2/1978  Yanagawa .............................. 355/1

Primary Examiner—Monroe H. Hayes
Attorney, Agent, or Firm—Watson, Cole, Grindle & Watson

[57] ABSTRACT

In an image-forming apparatus, a shield case housing an optical fiber tube for projecting images on the surface of a photoconductive drum is movable to an exposure position close to the surface and to a non-exposure position away from the surface. A cleaning device cleans only the face of the optical fiber tube in the non-exposure position in response to the closing of the main switch of the apparatus and upon detecting that the tube is in the non-exposure position away from the surface of the drum.

9 Claims, 15 Drawing Figures

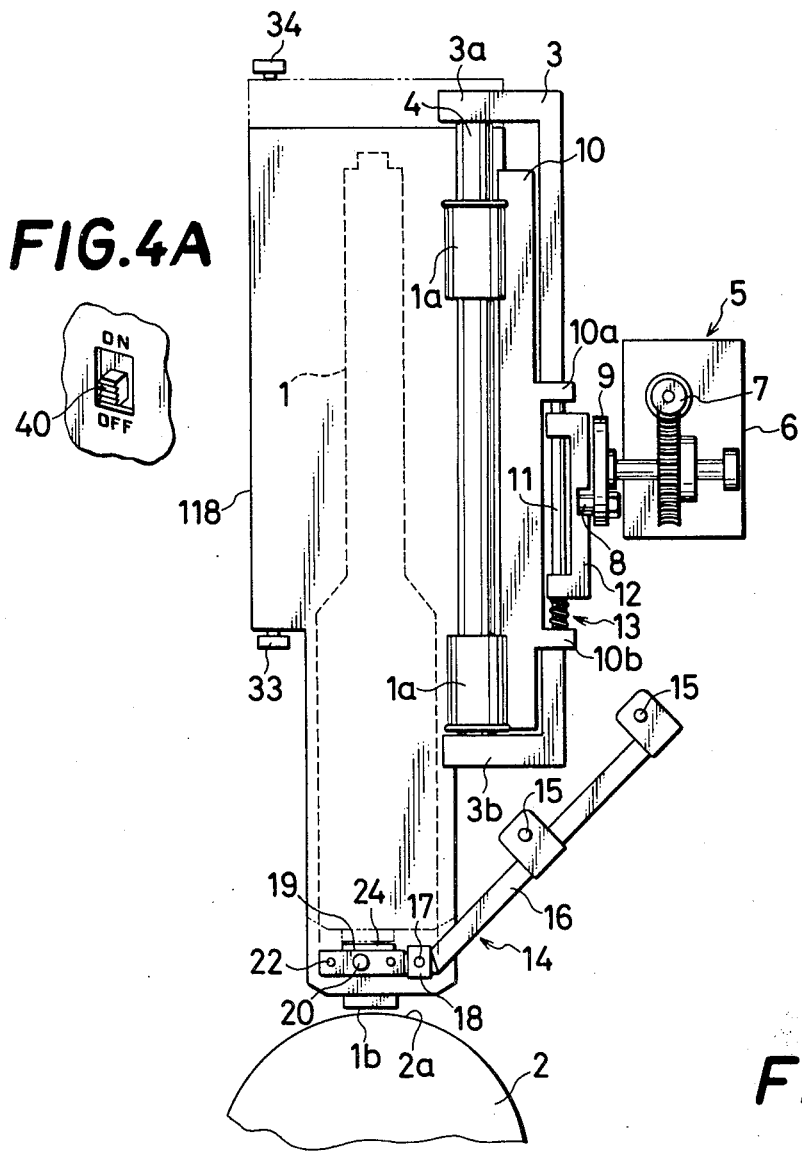
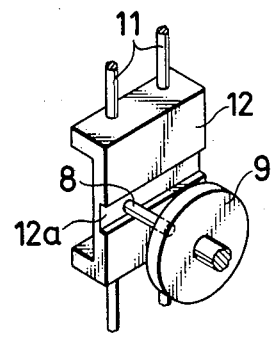

DEVICE FOR CLEANING OPTICAL FIBER TUBE INCORPORATED IN IMAGE FORMING APPARATUS

BACKGROUND OF THE INVENTION

The present invention relates to a device for cleaning the face of an optical fiber tube employed in an image-forming apparatus, the optical fiber tube acting as a means for exposing a reproduction surface to optical images.

Optical fiber tubes are conventionally used as a means for exposing surfaces to optical images because such optical elements not only form distinct point images but limit diffusion of rays while retaining the desired image strength in a vacuum. When optical fiber tubes are used for projecting optical images onto a surface, such as a photoconductive drum surface in an electrophotographic copier, the face of the tube is brought to a position usually about 0.2 to about 0.5 mm from the surface. Accordingly, the tube face is prone to having toner, dust or the like rays deposited thereon, which particles block the emitted from the tube and thus adversely affect the image produced on the exposed surface.

To overcome this problem, the tube can be removed from the apparatus and its free cleaned, or an air stream can be applied to the periphery of the tube face to expel the toner, dust or the like, or the clearance between the tube face and the drum surface can be sealed. However, it is impossible to perfectly prevent the tube face from becoming stained by the application of air or by sealing, thus resulting in the need to remove the tube from the apparatus for cleaning with a cloth or the like (either at predetermined times or when adversely affected images are produced), and this is cumbersome and time consuming.

Although U.S. Pat. No. 4,074,217 discloses a cleaner which is adapted to wipe an end face of an assembly of focusing light-transmitting members every time the original receptacle of a copying machine is reciprocated, utilizing the reciprocation of the receptacle, such a cleaner system is not usable in an image-producing apparatus wherein the optical fiber tube therein must be positioned very close to the surface on which the image is to be produced.

An object of the present invention is to provide a device for cleaning the face of an optical fiber tube incorporated in image-forming apparatus. More particularly, the main object of the invention is to provide a device for cleaning the face of such an optical fiber tube automatically, easily and effectively, utilizing the usual operation of the image-forming apparatus to thereby overcome the foregoing problems heretofore encountered.

SUMMARY OF THE INVENTION

The present invention provides a device for cleaning an optical fiber tube incorporated in an image-forming apparatus as a means for exposing a surface to images, the device being characterized in that at least in response to the closing of a main switch on the apparatus and upon detecting that the optical fiber tube is in a non-exposure position away from the surface to be exposed, a cleaning device operates to clean only the face of the tube in the non-exposure position.

According to the present invention, the optical fiber tube is movable to the non-exposure position and the face of the tube can be cleaned automatically without resorting to the manual procedure heretofore needed in order to keep the tube face clean at all times and produce sharp copy images. The tube face can be easily and effectively cleaned, utilizing the usual operation of the image-forming apparatus, for example, in response to the ON-OFF operation of the main switch, a jam signal and an inspection door opening signal. With the optical fiber tube retained in the non-exposure position while the image-forming apparatus is held out of operation, the tube face and the surface to be exposed can be prevented from marring or defacement that would result if the tube face were retained in a position close to the surface.

The invention will now be more fully described below with reference to the embodiments shown in the accompanying drawings.

BRIEF DESCRIPTION OF THE DRAWINGS

FIG. 4 is an enlarged side elevation showing another embodiment of the invention;

FIG. 4A shows a perspective view of the main power switch used on the embodiment of the invention of FIG. 4;

FIG. 5 is a fragmentary perspective view of FIG. 4;

DETAILED DESCRIPTION OF THE INVENTION

Figure 1:
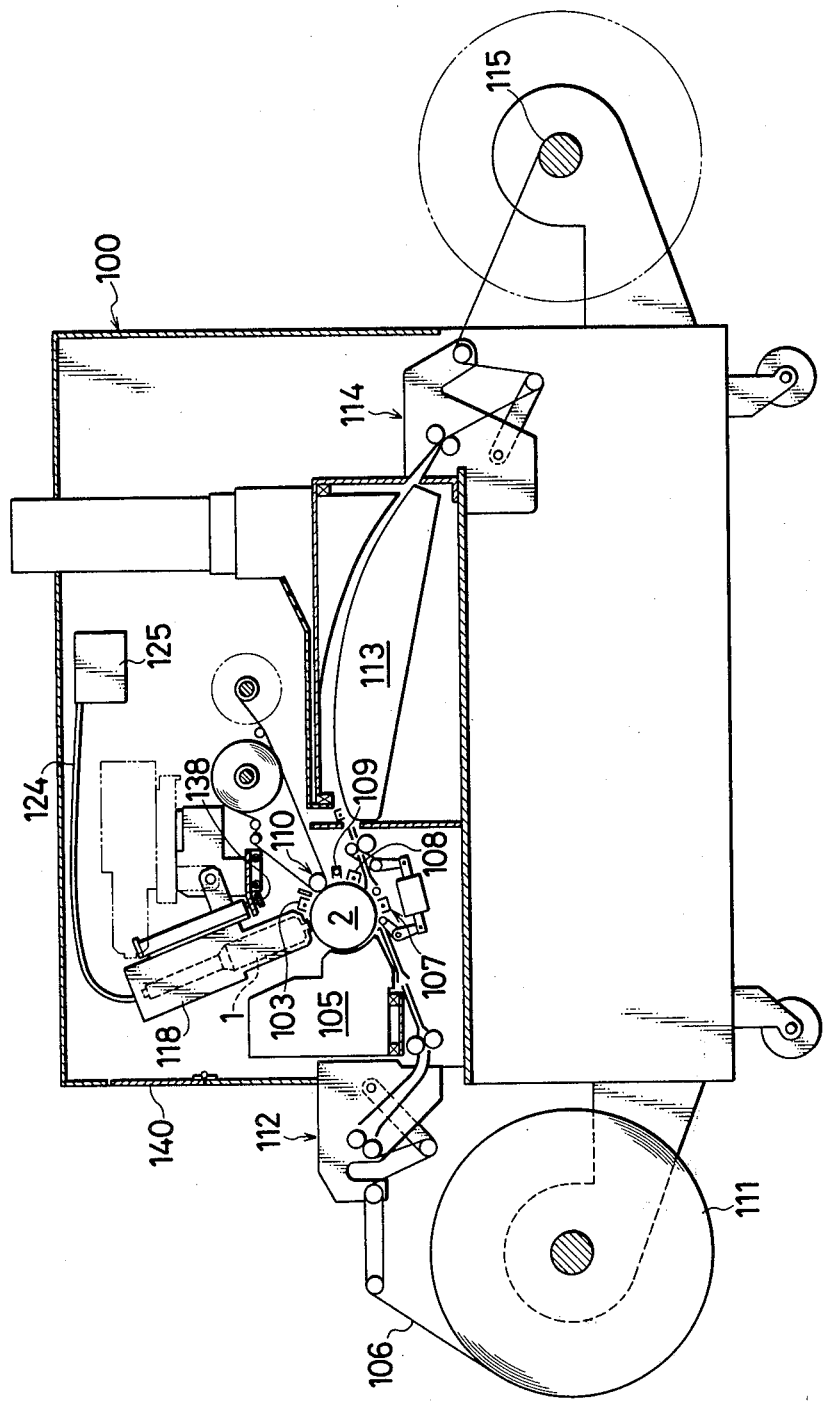
FIG. 1 is a diagram in section showing an image-forming apparatus including a device of the invention for repositioning an optical fiber tube used therein.

FIG. 1 is a sectional view of an image-forming apparatus 100 equipped with an optical fiber tube (OFT) to which air is applied to prevent deposition of dust, toner and the like on the end face of the tube. Arranged around a photoconductive drum 2 are a charger 103 for uniformly charging the surface of the drum 2, the OFT 1 for forming a latent electrostatic image on the drum 2, a developing unit 105 for developing the latent image to a toner image, a transfer unit 107 for transferring the developed image onto copy paper 106, an erasing charger 108 for removing the residual charge from the drum 2, an eraser lamp 109 therefor, a cleaner 110 for removing the residual toner from the drum 2, etc. The copy paper 106 is paid off from a roll 111 by a feeder 112, passed over the transfer unit 107 and a fixing unit 113 and then through a discharging unit 114, and wound into a roll 115.

With the image-forming apparatus 100, an electric image signal is sent from a control unit (not shown) to the OFT 1, in which the signal is converted to an optical signal to project an image on the photoconductive drum 2 in rotation. A toner image is formed on the copy paper 106 by a known electrophotographic process.

Figure 2:
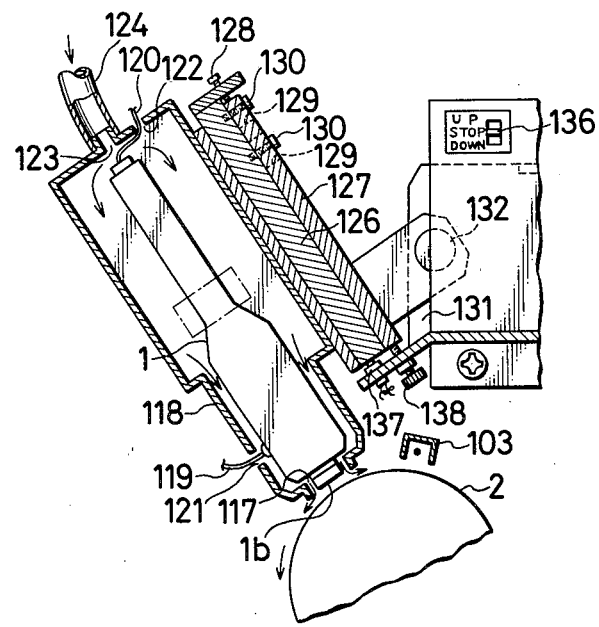
FIG. 2 is a fragmentary enlarged view in section of FIG. 1.
Figure 3:
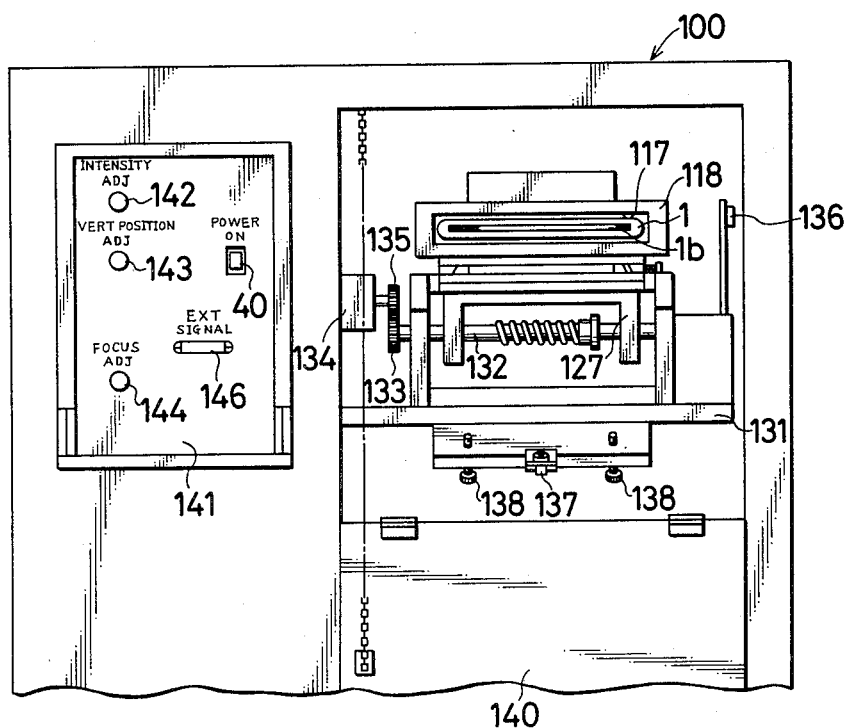
FIG. 3 is a front view of the apparatus of FIG. 1 with its cover plate opened to show the optical fiber tube positioned away from the surface to be exposed.
Figure 6:
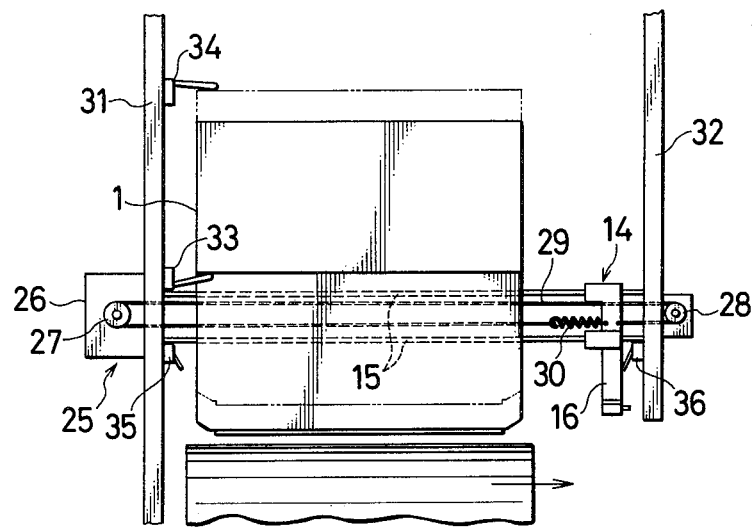
FIG. 6 is a front view.

With reference to FIGS. 2 and 3, a support assembly for the OFT 1 will be described as an example. The OFT 1 is fixedly housed in a shield case 118 having an opening 117 larger than the face 1b of the OFT 1. The shield case 118 is settable in position so that the tube face 1b faces the drum 2 through the opening 117, which provides an air-passing clearance around the tube face 1b. Wires 119 and 120 connected to the anode and cathode of the OFT 1 extend through holes 121 and 122 formed in the case 118. Close to the cathode, the case 118 has an air aperture 123 to which one end of a flexible pipe 124 is connected. The other end of the pipe 124 is connected to a fan 125 (see FIG. 1).

The shield case 118, which has a support plate 126 attached thereto is movably mounted on a base 127. The clearance between the OFT 1 and the drum 2 is adjustable by a screw 128. The case 118 can be fixed to the base 127 by a pair of screws 130 extending through a pair of slots 129.

The base 127 is fixed to a shaft 132 which is rotatably mounted on the frame 131 of the apparatus 100. As seen in FIG. 3, the shaft 132 is coupled to a gear 135 on a motor 134 through a gear 133 on one end of the shaft 132. The motor 134 is adapted to be operated by a changeover switch 136, an upper limit switch (not shown) and a lower limit switch 137. When the OFT 1 is brought to the specified position (shown in FIG. 2), the base 127 comes into contact with the lower limit switch 137 to operate the switch 137 and also with a pair of screws 138 to position the tube face 1b of the OFT 1 in opposed relation to the drum 2. The switch 137 and screws 138 are mounted on the frame 131. The parallelism between the tube face 1b and the drum 2 is adjustable by turning the screws 138.

Beside a door 140 which is openable for observing the OFT, there is provided an adjusting panel 141 for the adjustment of the OFT 1 (see FIG. 3). The panel 141 has a knob 142 for adjusting the intensity of the OFT 1, a knob 143 for adjusting the position of the OFT vertically, namely, upward or downward in FIG. 3, a focus-adjusting knob 144, a power supply switch 40, an external input terminal 146, etc.

When the OFT 1 is opposed to the drum 2 in the above arrangement, the base 127 is in contact with the screws 138, and a clearance of 0.2 to 0.3 mm is provided between the tube face 1b and the surface of the drum 2. An electric signal is fed from a control unit (not shown) to the OFT 1 in this position to cause the tube face 1b to emit light and form a latent electrostatic image on the drum 2 which is driven at the same time. The latent image is transferred onto the copy paper as a visible image by the known electrophotographic process as already described. At this time, the fan 125 is operated to supply air to the shield case 118 through the pipe 124. Although the air slightly leaks from the holes 121 and 122, a major portion of the air flows out from the opening 117 around the OFT 1 to cool the OFT 1 and prevent deposition of dust on the tube face 1b and deposition of the residual toner on the drum 2 as already stated. As already described, however, it is impossible to effectively prevent the tube face from staining only by the ejection of air. In this invention, therefore, the OFT is movable away from the surface of the drum 2 to a retracted position, where the tube face can be cleaned.

When the change-over switch 136 is turned to "up", the motor 134 rotates, turning the base 127 about the shaft 132 clockwise in FIG. 2. With the turn of the base, the shield case 118 housing the OFT 1 turns to the two dotted line position in FIG. 1 and pushes the unillustrated upper limit switch, which de-energizes the motor 134 to stop the case 118. When the OFT 1 is thus moved by turning, the tube face 1b of the OFT 1 can be observed from outside at the position away from the drum 2, and the image on the tube face 1b is adjustable variously with ease with the knobs on the panel 141. Further, when an external signal is fed to the input terminal 146, the signal reproduced on the OFT 1 can be observed.

When the change-over switch 136 is turned to "down", the motor 134 rotates again, turning the OFT 1 to the position shown in FIG. 2 where the base 127 pushes the lower limit switch 137. This positions the tube face 1b a preset distance away from the drum 2 without the necessity of readjustment.

Since the OFT 1 is turned, there is no need to detach the terminals for the cathode, anode and deflection coil or to electrically adjust the OFT on the panel 141 after the OFT is turned to the original position.

The foregoing mechanism for moving the OFT 1 toward or away from the surface of the drum 2 is usable for the cleaning device of the invention to be described below and has various advantages as already described, but the mechanism has the disadvantages of necessitating a large space for the turn of the shield case or OFT. Described below is another mechanism for moving the OFT toward or away from the surface of the drum and the cleaning device of the invention in combination with the mechanism.

Throughout the drawings, like parts and apparatus are referred to by like reference numerals, and the apparatus to be described below has the same construction as the apparatus shown in FIG. 1 except for the OFT moving mechanism and other means to be specifically described below. The cleaning device of the invention is clearly not limited in its application only to the apparatus shown in FIG. 1.

Although the vertical movement of the OFT 1 in the embodiment of FIGS. 1 to 3 has been described above as being controllable by the change-over switch 136 for convenience, the movement of the OFT is operatively related to the ON-OFF operation of the main switch 40 for automatic cleaning in the embodiment to be described below.

FIGS. 4 to 11 show another embodiment of the invention. FIG. 4 shows an optical fiber tube (OFT) 1 and a photoconductive drum 2 incorporated in an image-forming apparatus 100, such as an electrophotographic copying apparatus. The OFT 1 is fixedly housed in a shield case 118 which is vertically movably supported by sliders 1a mounted on a rail 4 and disposed between upper and lower stoppers 3a and 3b of a holder frame 3 fixed to the frame of the apparatus. The face 1b of the OFT 1 is movable between two positions, namely, an exposure position indicated in a solid line in FIG. 4 and close to the surface 2a of the drum 2 to be exposed, and a non-exposure position in which the tube face 1b is away from the surface 2a as indicated in a phantom line in FIG. 4.

The OFT is coupled to means 5 for moving the OFT 1 between the two positions. The OFT moving means 5 comprises a motor 6 and a crank plate 9 having a crank pin 8 and coupled to the motor 6 through a speed reduction assembly 7. A slide plate 12 is slightly vertically movably supported by guide rods 11 extending between upper and lower driven pieces 10a and 10b on the rear side of a base plate 10 of the OFT 1. The crank pin 8 is engaged in a lateral groove 12a in the slide plate 12 as seen in FIGS. 4 and 5. When the crank pin 8 is revolved by the positive or reverse rotation of the motor 5, the pin 8 in the groove 12a moves the slide plate 12 vertically. The slide plate 12 bears against the upper driven piece 10a to determine the level of the OFT 1 and, when vertically moved, moves the OFT 1 between the exposure position and the non-exposure position. Since the exposure position of the OFT 1 must be accurately determined relative to the surface 2a to be exposed in view of the resolving power (which increases with the approach of the tube 1 to the surface 2a) and for the protection of the surface 2a and the tube face 1b (the greater the distance between the tube 1 and the surface 2a, the better), the exposure position is determined by the lower stopper 3b. When moved down away from the upper driven piece 10a, the slide plate 12 depresses the lower driven piece 10b with a spring 13, causing the lower slider 1a to properly contact the lower stopper 3b to provide an accurate exposure position. The spring 13 serves also as a shock absorber to afford the accurate position.

Disposed beside the shield case 118 is means 14 for cleaning the tube face 1b only when the OFT 1 is in its non-exposure position. The cleaning means 14 comprises a member 16 which is held and guidable by lateral stays 15 to move a cleaning member 24, a cleaning member holder 18 hinged to the forward end of the moving member 16 as at 17, and a cleaning member mount 19 detachably supported by the holder 18. The mount 19 is provided in the center of its slide plate with a knob 20 having a threaded inner end 20a which is screwed into a threaded hole 21 in the center of a side plate of the holder 18 to detachably hold the mount 19 thereto. The mount 19 is held to the holder 18 in position by a pair of positioning pins 22 on the side plate of the holder 18 engaged in pin holes 23 in the side plate of the mount 19.

The holder 18 is retained in a horizontal position by the contact of the top plate of the holder 18 with the horizontal upper edges 16a of bent forward end portions of the moving member 16 near the location where the holder 18 is hinged as at 17 (as supported by screws) to the member 16. The guide stays 15 provide a horizontal path of movement for enabling the cleaning member 24 on the mount 19 in the horizontal position to wipe the face 1b of the tube 1 in the non-exposure position. The holder 18 is biased by a spring in the direction of an arrow in FIG. 8 about the hinge connection 17 to hold the cleaning member 24 in pressing contact with the tube face 1b during the movement along the horizontal path, thus permitting the cleaning member 24 to thoroughly clean the tube face 1b. To press the cleaning member 24 against the tube face 1b suitably, the above-mentioned spring has such a small force as to slightly raise the holder 18, or a stopper (not shown) is provided for preventing the holder 18 from rising to excess. The cleaning member 24 is affixed to the mount 19, for example, with adhesive applied to the rear side of the member 24. The mount 19 covers the upper side of the holder 18 when attached thereto. When stained, the cleaning member 24 is peeled off the mount 19 and replaced by a new one. The member 24 may be made of a suitable material, such as cloth, that is durable and will not deface the tube face 1b.

The tube face-cleaning means 14 is movable by means 25 comprising a cleaner motor 26 and a wire 29 reeled around pulleys 27 and 28 and reciprocatingly driven by the motor 26. The wire 29 is attached by a spring 30 to the moving member 16 to reciprocate the cleaning member 24 on the member 16 along a horizontal path.

Side plates 31 and 32 support the guide stays 15 and are provided with a switch 33 for detecting the exposure position of the OFT 1, a switch 34 for detecting the non-exposure position thereof, a switch 35 for detecting completion of the forward movement of the cleaning means 14 and a switch 36 for detecting completion of the return of the means 14. The cleaning means 14 is returned to a position on one side of the drum 2 toward which the drum is withdrawn from the frame of the apparatus as indicated by an arrow in FIG. 6 because on this side of the drum 2 there is provided a door for the withdrawal of the drum 2, inspection of the interior of the apparatus, etc. The cleaning means 14, when retained in the returned position on this side, is easy to inspect and permits replacement of the cleaning member 24 with ease.

Figure 9:
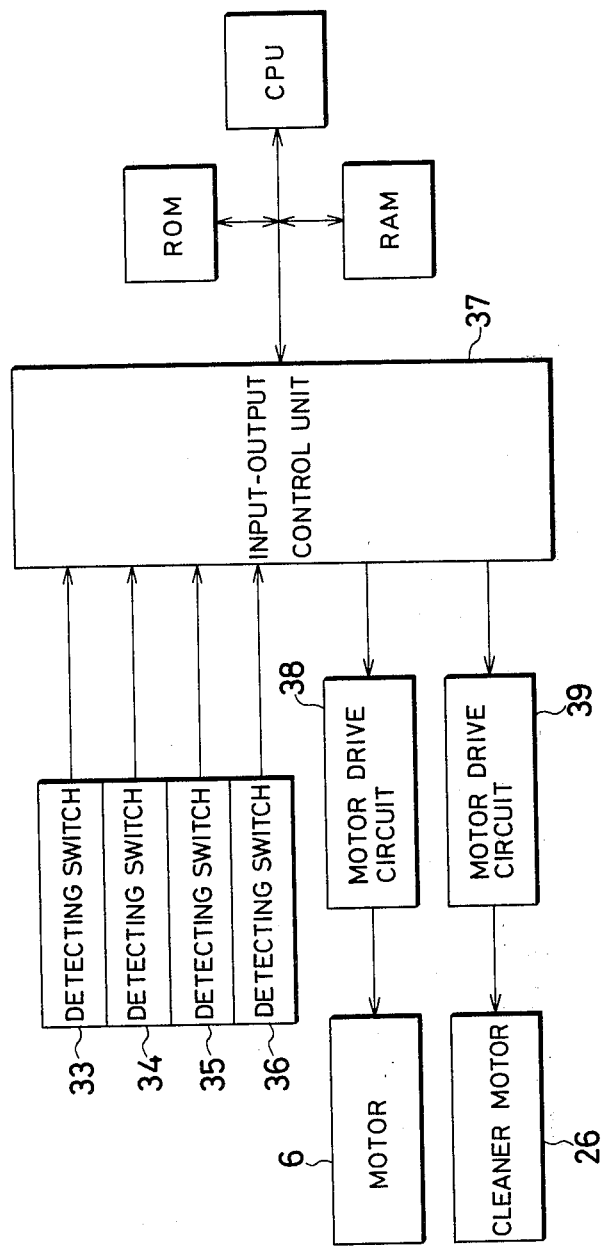
FIG. 9 is a block circuit diagram of cleaning operation control means.
Figure 10:
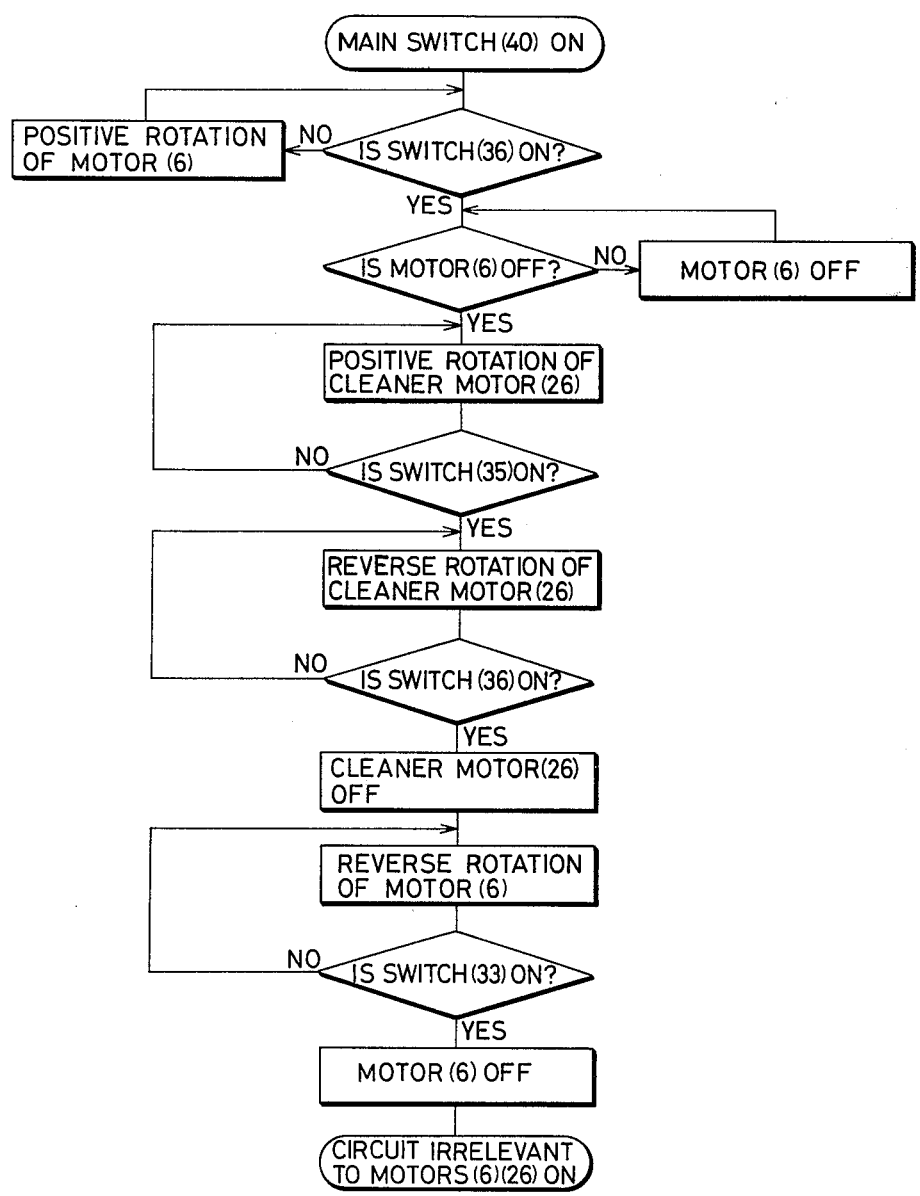
FIGS. 10 and 11 are flow charts showing a mode of operation control.

FIG. 9 is a block circuit diagram showing means for controlling the operation of the tube face-cleaning means 14. The control means is provided by a microcomputer included in the image-forming apparatus and used for the copying operation. The ON-OFF signals from the detecting switches 33, 34, 35 and 36 are fed to an input-output control unit 37 coupled to a central processing unit CPU. The operating output signals for the motors 6 and 26 are driven by the control unit 37 to circuits 38 and 39 for driving these motors. In response to the signals from the detecting switches 33 to 36 and the main switch 40 (see FIG. 4A) which is provided on the apparatus of FIG. 4 (and which feeds input signals to the central processing unit CPU independently of the input-output control unit 37 for controlling the contemplated operation of the apparatus), the motors 6 and 26 are energized for positive or reverse rotation and deenergized according to a predetermined program.

Figure 7:
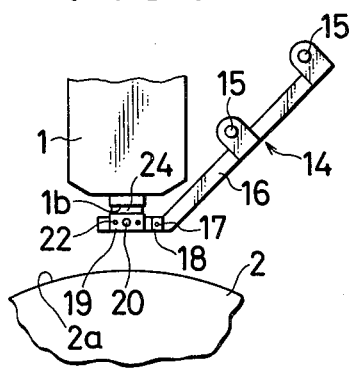
FIG. 7 is a fragmentary side elevation showing an optical fiber tube in its non-exposure position.

More specifically stated, while the main switch 40 on the apparatus is off, the OFT 1 is held in its non-exposure position shown in FIG. 7 and also indicated in a phantom line in FIG. 4, and the non-exposure position-detecting switch 34 is on. Upon turning on the main switch 40 in this state, the cleaner motor 26 is positively driven in response to the resulting signal and to an ON signal from the switch 34 to move the cleaning means 14 forward, namely leftward, from the position of FIG. 6. The motor 26 is positively driven when the switch 36 for detecting the completion of return is on and the switch for detecting the completion of forward movement, 35, is off. Upon the initiation of the forward movement of the cleaning means 14, the switch 36 is opened.

With the forward movement, the cleaning means 14 automatically cleans the tube face 1b of OFT 1, and closes the switch 35 upon completing the forward movement. This causes the cleaner motor 26 to rotate in the reverse direction to return the cleaning means 14 to the original position in FIG. 6. The means 14 cleans the tube face 1b also during the return movement and, upon completing the return movement, closes the switch 36 again, whereby the cleaner motor 26 is stopped. After the de-energization of the motor 26, the motor 6 rotates reversely, bringing the OFT 1 toward the surface 2a of the drum 2 to the specified position as shown in the solid line in FIG. 4 and indicated in FIG. 6. When the tube 1 is thus positioned close to the drum 2, the exposure position-detecting switch 33 is closed and the motor 6 is stopped. In this way, the cleaning operation is completed, and the OFT 1 in the exposure position is ready for a copying operation. Accordingly, a copy switch is thereafter turned on to make copies in the usual manner. The operation described above is illustrated in the flow chart of FIG. 10.

Figure 11:
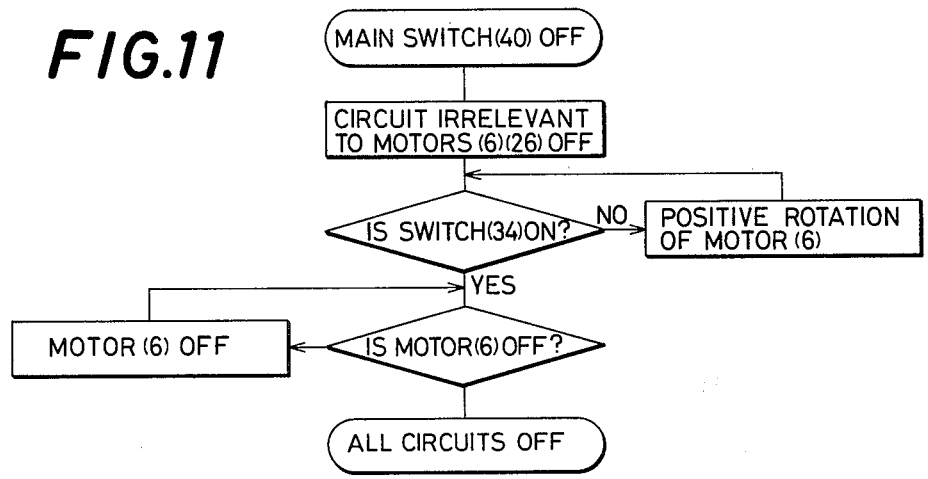
Figure 12:
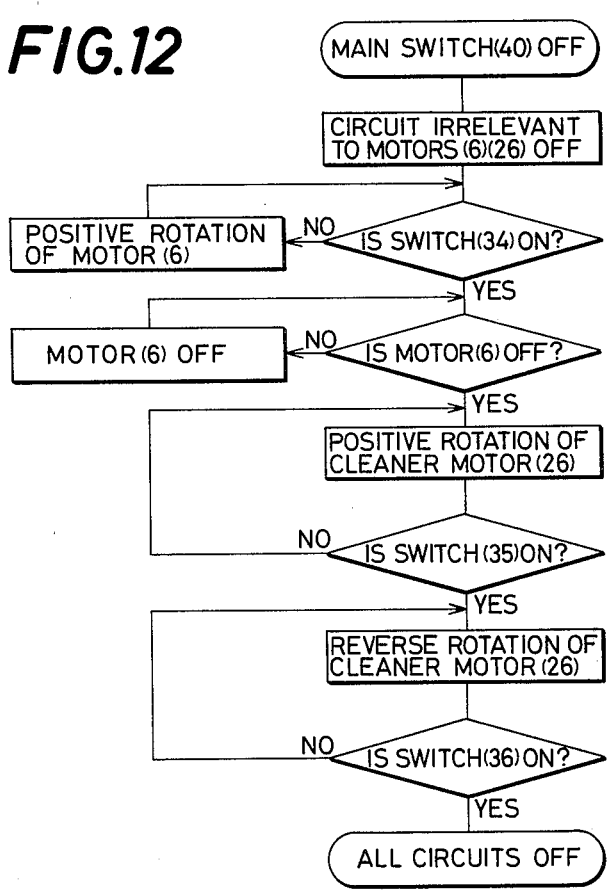
FIG. 12 is a flow chart of another mode of operation control.

When the main switch 40 on the apparatus is subsequently turned off, the apparatus is brought out of the copying operation, but the motor 6 rotates in the positive direction to move the OFT 1 upward to the non-exposure position and is thereafter halted as illustrated in the flow chart of FIG. 11. In addition to the rise of the OFT 1 with the turning off of the main switch 40, the tube 1 may be adapted to rise also when the apparatus is stopped by a jam signal or an inspection door opening signal so that the cleaning means 14 can be operated before the apparatus is initiated into the usual copying operation again. This increases the frequency of the cleaning operation. Further, if the cleaning means 14 is adapted to operate subsequent to the rise of the OFT 1 when the main switch 40 is turned off, the tube face 1b can be cleaned more frequently. This mode of operation is illustrated in the flow chart of FIG. 12.

In any of the foregoing cases, the OFT 1 is in its non-exposure position away from the surface 2a to be exposed always when the apparatus is held out of operation as by turning off of the main switch 40. This prevents defacement of the tube face 1b and the surface 2a.

Figure 8:
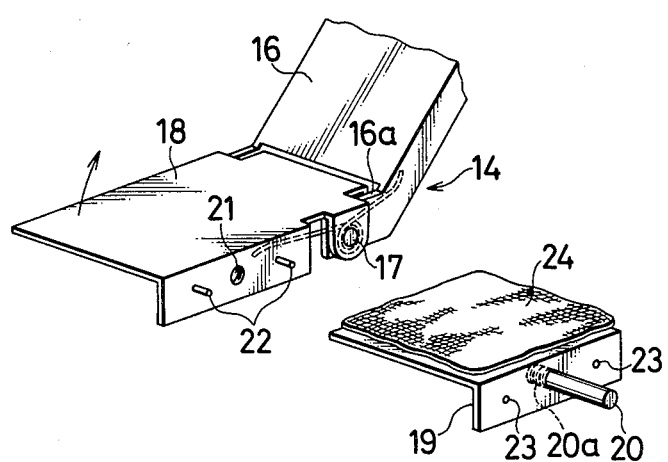
FIG. 8 is a fragmentary exploded perspective view showing tube face-cleaning means.
Figure 13:
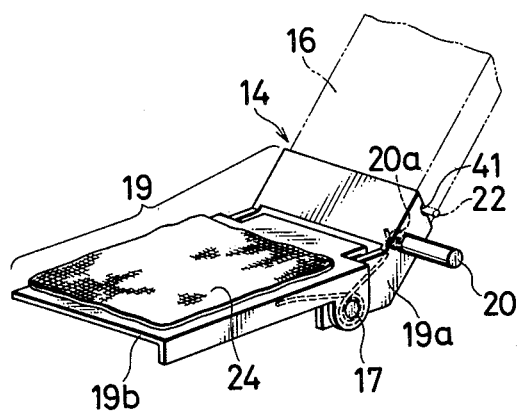
FIGS. 13 and 14 are perspective views showing a modification of the tube face-cleaning means.
Figure 14:
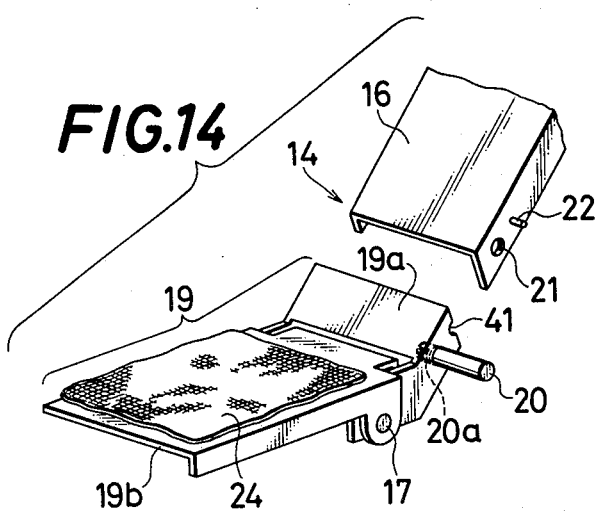

FIGS. 13 and 14 show an improvement over the cleaning means 14 shown in FIG. 8. A cleaning member mount 19 is detachably connected to a member 16 for moving the cleaning member 24. The mount 19 comprises a base portion 19a and a main body 19b. The base portion 19a is provided on a side wall thereof with a knob 20 having a threaded end 20a and is removably attached to the member 16 by screwing the threaded end 20a into a threaded hole 21 formed in a side wall of the member 16. The main body 19b is hinged as at 17 to the base portion 19a in the same manner as the holder 18 of FIG. 8 hinged to the member 16. The cleaning member 24 is affixed to the upper surface of the main body 19b. When the mount 19 is removed for the replacement of the cleaning member 24 in the case of FIG. 8, the holder 18 remains attached to the member 16, with the result that if the tube face 1b is cleaned with the mount 19 removed for one reason or another, the holder 18 without the cleaning member 24 will slide on the tube face 1b and mar the face 1b, whereas when the mount 19 of the present embodiment is detached, no part is likely to contact the tube face 1b. Thus, possible defacement of the tube face 1b is avoided.

A positioning pin 22 on the side wall of the member 16 engages in a cutout 41 formed in an end of the mount base portion 19a to retain the base portion 19a in position.

What is claimed is:

1. In an image-forming apparatus which includes an optical fiber tube for producing an image to be electrostatically copied in the surface of a photoconductive member, the optical fiber tube having a light-emitting surface which is susceptible to becoming dirty, the improvement wherein said image-forming apparatus includes first moving means connected to said optical fiber tube to position said optical fiber tube either at a first position in close proximity to the surface of said photoconductive member or at a second position located remotely of said surface of said photoconductive member; said optical fiber tube, when at said first position, producing an image to be reproduced on the surface of said photoconductive member from light emitted from said light-emitting surface thereof, and, when in said second position, being capable of having its light-emitting surface cleaned;

cleaning means capable of cleaning the tight-emitting surface of said optical fiber tube when said optical fiber tube is at said second position;

second moving means connected to said cleaning means for moving said cleaning means over said light-emitting surface of said optical fiber tube;

control means for controlling the operation of said first moving means and said second moving means;

a power switch operable to turn on the supply of electrical current to said image-forming apparatus or turnoff the supply of electrical current to said image-forming apparatus;

first detection means connected to said control unit for supplying a signal thereto when said optical fiber tube is at said second position;

said control means causing said second moving means to move said cleaning means over said light-emitting surface of said optical fiber tube when said power switch is turned on and said first detection means detects the positioning of said optical fiber tube at said second position.

2. The image-forming apparatus as defined in claim 1 wherein said control means automatically activates said first moving means to position said optical fiber tube at said second position when said power switch is turned off.

3. The image-forming apparatus as defined in claim 2 wherein said control means activates said second moving means to move said cleaning means over said light-emitting surface of said optical fiber tube when said power switch is turned off and said first detection means detects the positioning of said optical fiber tube in said second position.

4. The image-forming apparatus as defined in claim 3 wherein said second moving means is constructed to reciprocatingly move said cleaning means over the light-emitting surface of said optical fiber tube from a first station to a second station and back to the first station.

5. The image-forming apparatus as defined in claim 4 including a first sensor means for detecting the positioning of said cleaning means at said first station and a second sensor means for detecting the positioning of said cleaning means at said second station; wherein said first and second sensor means are connected to send signals to said control means, and wherein said control means activates said first moving means to position said optical fiber tube at said first position after said first and second sensors have sent signals thereto indicating a completion of one reciprocation of said cleaning means over said light-emitting surface of said optical fiber tube.

6. The image-forming apparatus as defined in claim 1 wherein said second moving means is constructed to reciprocatingly move said cleaning means over the light-emitting surface of said optical fiber tube from a first station to a second station and back to the first station.

7. The image-forming apparatus as defined in claim 6 including a first sensor means for detecting the positioning of said cleaning means at said first station and a second sensor means for detecting the positioning of said cleaing means at said second station; wherein said first and second sensor means are connected to send signals to said control means, and wherein said control means activates said first moving means to position said optical fiber tube at said first position after said first and second sensors have sent signals thereto indicating a completion of one reciprocation of said cleaning means over said light-emitting surface of said optical fiber tube.

8. The image-forming apparatus as defined in claim 1 wherein said first moving means is constructed to move said optical fiber tube toward and away from the surface of said photoconductive surface in parallel with a line extending longitudinally of said optical fiber tube.

9. The image-forming apparatus as defined in claim 1 wherein said image-forming means includes a frame and wherein said first moving means is constructed to rotate said optical fiber tube about a shaft connected to said frame.

* * * * *